US012679970B2

(12) United States Patent
Kang et al.

(10) Patent No.: US 12,679,970 B2
(45) Date of Patent: Jul. 14, 2026

(54) RESIN MOLDED PRODUCT HAVING HIGH IMPACT RESISTANCE AND LOW DIELECTRIC LOSS AND RADAR MODULE INCLUDING SAME

(71) Applicants: HYUNDAI MOBIS Co., Ltd., Seoul (KR); HYUNDAI Advanced Materials Co., Ltd., Hwaseong-si (KR)

(72) Inventors: Hyoung Taek Kang, Yongin-si (KR); Seung Jun Lee, Yongin-si (KR); Chul Min Shin, Yongin-si (KR); Eun Chang Lee, Yongin-si (KR); Seung Soo Hong, Osan-si (KR); Sang Gil Lee, Suncheon-si (KR); Kwon Mo Koo, Ulsan (KR); Sang Woon Hwang, Hwaseong-si (KR)

(73) Assignees: HYUNDAI MOBIS CO., LTD., Seoul (KR); HYUNDAI ADVANCED MATERIALS CO., LTD., Hwaseong-si (KR)

( * ) Notice: Subject to any disclaimer, the term of this patent is extended or adjusted under 35 U.S.C. 154(b) by 748 days.

(21) Appl. No.: 18/088,034

(22) Filed: Dec. 23, 2022

(65) Prior Publication Data

US 2023/0227648 A1 Jul. 20, 2023

(30) Foreign Application Priority Data

Jan. 18, 2022 (KR) ........................ 10-2022-0007004

(51) Int. Cl.

| | |
|---|---|
| ***C08L 69/00*** | (2006.01) |
| ***C08K 3/40*** | (2006.01) |
| ***C08K 7/14*** | (2006.01) |
| ***G01S 7/02*** | (2006.01) |

(52) U.S. Cl.

CPC .............. *C08L 69/005* (2013.01); *C08K 3/40* (2013.01); *C08K 7/14* (2013.01); *G01S 7/027* (2021.05); *G01S 7/023* (2013.01)

(58) Field of Classification Search

CPC ...... C08L 67/02; C08L 69/00; C08L 23/0815; C08L 23/0869; C08K 7/14

See application file for complete search history.

(56) References Cited

U.S. PATENT DOCUMENTS

| | | | | |
|---|---|---|---|---|
| 2006/0084733 A1* | 4/2006 | O'Brien | C08K 5/02 | 524/100 |
| 2006/0264556 A1* | 11/2006 | Lustiger | B29B 7/90 | 524/451 |
| 2008/0217961 A1* | 9/2008 | Lustiger | B29B 9/14 | 296/193.09 |
| 2021/0147622 A1* | 5/2021 | Monden | C08G 64/06 | |

FOREIGN PATENT DOCUMENTS

| | | | | |
|---|---|---|---|---|
| KR | 10-2021-0054605 A | | 5/2021 | |
| KR | 20210070592 A | * | 6/2021 | C08L 53/025 |

* cited by examiner

*Primary Examiner* — Anthony J Frost

(74) *Attorney, Agent, or Firm* — MORGAN, LEWIS & BOCKIUS LLP

(57) ABSTRACT

The present invention relates to a resin molded product having excellent impact resistance and weather resistance and low dielectric loss and a RADAR module including the same, wherein the resin molded product has a permittivity of 3.7 F/m or less and a dielectric loss of 0.023 or less in the frequency range of 77 GHz, has a high-speed impact strength according to ASTM D3763 of 400 $kg \cdot m/s^2$ or greater, and has an electromagnetic wave transmission coefficient of −0.8 dB or greater in the frequency range of 77 GHz to 79 GHz.

16 Claims, No Drawings

RESIN MOLDED PRODUCT HAVING HIGH IMPACT RESISTANCE AND LOW DIELECTRIC LOSS AND RADAR MODULE INCLUDING SAME

CROSS-REFERENCE TO RELATED APPLICATIONS

This application claims the benefit of Korean Patent Application No. 10-2022-0007004, filed on Jan. 18, 2022, in the Korean Intellectual Property Office, the disclosure of which is incorporated herein in its entirety by reference.

BACKGROUND OF THE DISCLOSURE

Field of the Invention

The present invention relates to a resin molded product having excellent impact resistance and weather resistance and low dielectric loss and a RADAR module including the same.

Description of the Related Art

As part of the advancement of vehicles such as automobiles, the demand for parts with various designs and functions is rapidly increasing. Particularly, as the issue of vehicle accidents is increasing, technology for utilizing a transmission/reception control device such as vehicle RADAR for increasing the safety of a driver when driving a vehicle is becoming more important.

An example of such transmission/reception control device technology includes the ACC technology of detecting a vehicle in front and controlling the speed of a vehicle according to the speed of the vehicle in front, or the CDM technology of operating an automatic brake with an alarm to a driver when a collision between a vehicle in front and a host vehicle is predicted.

Meanwhile, the transmission/reception control device technology is implemented by having a RADAR module mounted on a vehicle, and collecting information on the movement of a vehicle in front and changes in a surrounding environment through the transmission/reception of a laser beam radiated from the RADAR.

In general, a RADAR module includes an antenna for transmitting/receiving a laser beam, internal electronic components such as a millimeter-wave radio frequency integrated circuit (RFIC), etc., and a radome for protecting these components. In addition, a cover for protecting the RADAR module is disposed in front of the radome.

A transmission cover for covering the front of the RADAR module such as the radome and the cover is required to have sufficient rigidity in order to protect internal components such as an antenna inside the RADAR from an external environment such that the internal components operate normally, and is required to minimize transmission loss during transmission of a RADAR beam radiated from the antenna.

Therefore, a PBT-based main material mixed with glass fiber (GF) as a reinforcing filler is typically used as a RADAR module such as a radome and a cover, but as the content of the glass fiber increases, mechanical properties of a required material increases, whereas the brittleness thereof deteriorates, so that it is difficult to secure rigidity due to an external impact, and also, there is a problem in that dielectric properties affecting RADAR transmission performance are deteriorated. In addition, when a rubber-based additive is mixed with the PBT-based main material to improve toughness, impact resistance may be improved, but weather resistance is degraded, and there is a problem in that there is a deviation in dielectric properties according to the dispersibility of the rubber-based additive.

Therefore, it is necessary to develop a RADAR module material such as a radome and a cover having excellent impact resistance and weather resistance and excellent low dielectric loss.

RELATED ART DOCUMENT

Patent Document (Patent Document 1) KR 10-2021-0054605 A

SUMMARY OF THE INVENTION

An aspect of the present invention provides a resin molded product which may be usefully used as a RADAR module material having excellent impact resistance, weather resistance, and dielectric properties.

Another aspect of the present invention provides a RADAR module including the resin molded product.

According to an aspect of the present invention, there is provided a resin molded product which has a permittivity of 3.7 F/m or less and a dielectric loss of 0.023 or less in the frequency range of 77 GHz, has a high-speed impact strength according to ASTM D3763 of 400 $kg\cdot m/s^2$ or greater, and has an electromagnetic wave transmission coefficient of −0.8 dB or greater in the frequency range of 77 GHz to 79 GHz.

According to another aspect of the present invention, there is provided a RADAR module including the resin molded product.

(1) The present invention provides a resin molded product which has a permittivity of 3.7 F/m or less and a dielectric loss of 0.023 or less in a frequency range of 77 GHz, has a high-speed impact strength of 400 $kg\cdot m/s^2$ or greater according to ASTM D3763, and has an electromagnetic wave transmission coefficient of −0.8 dB or greater in a frequency range of 77 GHz to 79 GHz.

(2) In (1) above, the present invention provides a resin molded product which has a high-speed impact absorbing energy of 3.5 $kg\cdot m^2/s^2$ or greater according to ASTM D3763.

(3) In (1) or (2) above, the present invention provides a resin molded product which has a permittivity of 2.5 F/m to 3.5 F/m and a dielectric loss of 0.005 to 0.020 in the frequency range of 77 GHz.

(4) In any one of (1) to (3) above, the present invention provides a resin molded product which has a high-speed impact strength of 400 $kg\cdot m/s^2$ or greater and a high-speed impact absorbing energy of 3.8 $kg\cdot m^2/s^2$ or greater according to ASTM D3763.

(5) In any one of (1) to (4) above, the present invention provides a resin molded product which has an electromagnetic wave transmission coefficient of −0.5 dB or greater in the frequency range of 77 GHz to 79 GHz.

(6) In any of (1) to (5) above, the present invention provides a resin molded product which has a chrominance (ΔE) of 3.0 or less, and wherein the chrominance represents a change in chromaticity after irradiation with an ultraviolet ray (340 nm) of 1,250 $kJ/m^2$ compared to chromaticity before the irradiation: ΔE=chromaticity after irradiation−chromaticity before irradiation.

(7) In any one of (1) to (6) above, the present invention provides a resin molded product including a polyester-based resin composition which has a base resin including polybutylene terephthalate (PBT) and polycarbonate (PC), an inorganic filler, and a rubber-based impact modifier.

(8) In (7) above, the present invention provides a resin molded product, wherein the base resin includes 65 to 95 wt % of polybutylene terephthalate (PBT) and 5 to 35 wt % of polycarbonate (PC).

(9) In (7) above, the present invention provides a resin molded product including an inorganic filler in an amount of 5 to 30 parts by weight based on 100 parts by weight of the base resin.

(10) In (7) above, the present invention provides a resin molded product including a rubber-based impact modifier in an amount of 5 to 15 parts by weight based on 100 parts by weight of the base resin.

(11) In (7) above, the present invention provides a resin molded product wherein the inorganic filler is glass fiber.

(12) In (7) above, the present invention provides a resin molded product, wherein the rubber-based impact modifier is one or more selected from a linear low-density polyethylene and an ethylene butyl acrylate copolymer.

(13) In (7) above, the present invention provides a resin molded product including 100 parts by weight of the base resin including polybutylene terephthalate (PBT) and polycarbonate (PC), 10 to 20 parts by weight of the inorganic filler, and 7 to 10 parts by weight of the rubber-based impact modifier, wherein the base resin includes 70 to 90 wt % of the polybutylene terephthalate (PBT) and 10 to 30 wt % of the polycarbonate (PC).

(14) In any one of (1) to (13) above, the present invention provides a resin molded product which is an electromagnetic absorbing material.

(15) In any one of the (1) to (13), the present invention provides a resin molded product which is a material for a RADAR module.

(16) The present invention provides a RADAR module including the resin molded product of any one of (1) to (15) above.

(17) In (15) above, the present invention provides a RADAR device wherein the RADAR module includes any one or more selected from a vehicle radome and a vehicle RADAR cover.

Advantageous Effects

A resin molded product according to the present invention has dielectric loss, surface impact strength, electromagnetic wave transmission coefficient, and color change simultaneously satisfying specific conditions, so that there is an effect in that the weather resistance, impact resistance, and dielectric properties are excellent.

A RADAR module according to the present invention includes the resin molded product, so that there is an effect in that the weather resistance, impact resistance, and dielectric properties are simultaneously excellent.

DETAILED DESCRIPTION

Hereinafter, the present invention will be described in more detail to allow for a clearer understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Definition of Terms

In the present specification, the term 'permittivity (F/m)' refers to the degree to which charges of opposite polarities are accumulated on an applied surface when a potential difference is applied to both ends of a certain material. For example, when the certain material is inserted between two conductors, and then voltages are applied to the conductors, and if a (−) charge is induced on a surface of the material to which a (+) voltage is applied, and a (+) charge is induced on a surface thereof to which a (−) voltage is applied without a current flowing, the size of a capacitance (Farad) per unit length (m) formed by the amount of charges induced in the material is called the permittivity (F/m).

In the present specification, the term 'dielectric loss' is referred to a case when an electric field is applied to a dielectric, if an electrical displacement shows a phase delay with respect to the electric field, part of electrical energy changes into heat in the material, which is called the dielectric loss and is represented as a loss tangent.

In the present specification, the terms 'including' and 'having,' and derivatives thereof, whether they are specifically disclosed or not, do not intend to exclude the presence of any additional components, steps or procedures. In order to avoid any uncertainty, all materials and methods as claimed through the use of the term 'including' may include any additional additives, supplements, or compounds unless otherwise stated. In contrast, the term 'consisting essentially of' excludes, with the exception of those not essential to operability, any other components, steps, or procedures from the scope of any subsequent descriptions.

The term 'consisting of' excludes any components, steps or procedures not specifically stated or listed.

[Measurement Method and Conditions]

In the present specification, 'permittivity and dielectric loss' were measured by the OPEN RESONATOR analysis method using a Vector Network Analyzer (MS46322A, ANRITSU Corp.) and a Split Post Dielectric Resonators (QWED Corp.) after preparing a specimen having a size of 100 mm×100 mm and a thickness of 2 T, and measured at a frequency of 77 GHz.

In the present specification, 'high-speed impact strength and high-speed impact absorbing energy were measured by preparing a specimen having a size of 100 mm×100 mm and a thickness of 2 T according to ASTM D3763 standards and using Dynatup (CEAST9350, INSTRON Corporation) at room temperature (23±2° C.) and a relative humidity of 50% with an impact velocity set to 3.3 m/s and a time range for data acquisition set to 30 ms.

In the present specification, an 'electromagnetic wave transmission coefficient' was measured utilizing a free space method using a dielectric condensing lens, and the measurement was performed with a measurement frequency set in the frequency range of 77 GHz, and a measurement position set around the center point of a specimen, and the electromagnetic wave transmission coefficient was represented by the largest absolute value of an electromagnetic wave transmission coefficient S21 in the frequency range.

In the present specification, 'chrominance (ΔE)' was measured using an accelerated weathering tester (Weather- O-Meter (Ci5000), ATLAS Corp.), and after a specimen of 60 mm×150 mm (width×height) was prepared, an ultraviolet ray (340 nm) of about 50 $kJ/m^2$ per day, a total of 1250 $kJ/m^2$ (about 25 days), was irradiated on a mirror surface of the specimen and on a corroded specimen under the conditions of Black PNL temperatures: 70±2° C. (light) and 38±2° C. (dark), Cycle conditions: irradiation for 40 minutes (50±5% RH), irradiation for 20 minutes (surface spray), irradiation for 60 minutes (50±5% RH), and non-irradiation for 60 minutes (95±5% RH/backside spray), irradiance: 0.75±0.02 $W/m^2$ (340 nm), and filter combinations: RIGHT LIGHT (inner filter) and QUARTZ (outer filter). Thereafter, a change in chromaticity after irradiation compared to chromaticity before the irradiation (chromaticity after irradiation−chromaticity before irradiation) was calculated and represented as the chrominance (ΔE).

Resin Molded Product

The present invention provides a resin molded product having excellent impact resistance, weather resistance, and dielectric properties, and thus, may be easily applied as a RADAR module, particularly a RADAR module material for a vehicle.

The resin molded product according to an embodiment of the present invention may have a permittivity of 3.7 F/m or less and a dielectric loss of 0.023 or less in the frequency range of 77 GHz, may have high-speed impact strength according to ASTM D3763 of 400 $kg \cdot m/s^2$ or greater, and may have an electromagnetic wave transmission coefficient of −0.8 dB or greater in the frequency range of 77 GHz to 79 GHz.

In addition, the resin molded product may have a chrominance (ΔE) of 2.0 or less, wherein the chrominance may represent a change in chromaticity after irradiation with an ultraviolet ray (340 nm) of 1,250 $kJ/m^2$ compared to chromaticity before the irradiation (chromaticity after irradiation−chromaticity before irradiation).

According to an embodiment of the present invention, the resin molded product satisfies the above permittivity, dielectric loss, high-speed impact strength, electromagnetic wave transmission coefficient, and color change simultaneously, so that there is an effect in that the impact resistance, weather resistance, and dielectric properties are all excellent in a balanced manner.

Specifically, the resin molded product may have a permittivity of 3.7 F/m or less and a dielectric loss of 0.023 or less in the frequency range of 77 GHz, more specifically a permittivity of 2.5 F/m to 3.5 F/m and a dielectric loss of 0.005 to 0.020 in the frequency range of 77 GHz, and even more specifically a permittivity of 3.0 F/m to 3.2 F/m and a dielectric loss of 0.005 to 0.015 in the frequency range of 77 GHz.

In addition, the resin molded product may have a high-speed impact strength according to ASTM D3763 of 400 kg·m/s2 or greater, and may have a high-speed impact absorbing energy according to ASTM D3763 of 3.5 $kg \cdot m^2/s^2$ or greater, 3.8 $kg \cdot m^2/s^2$ or greater, or 4.0 $kg \cdot m^2/s^2$ or greater.

As another example, the resin molded product may have a high-speed impact strength according to ASTM D3763 of 400 $kg \cdot m/s^2$ or greater, and may have a high-speed impact absorbing energy of 3.8 $kg \cdot m^2/s^2$ or greater.

In addition, the resin molded product may have an electromagnetic wave transmission coefficient of −0.8 dB or greater in the frequency range of 77 GHz to 79 GHz, specifically −0.8 dB to 0 dB, and specifically −0.5 dB or greater, or −0.5 dB to 0 dB. In this case, the impact resistance, weather resistance, and dielectric properties of the resin molded product are excellent in a balanced manner, and the RADAR transmission performance thereof may also be simultaneously excellent.

In addition, the resin molded product may have a chrominance (ΔE) of 3.0 or less, specifically 2.0 or less or 1.0 or less, wherein the chrominance represents a change in chromaticity after irradiation with an ultraviolet ray (340 nm) of 1,250 $kJ/m^2$ compared to chromaticity before the irradiation (chromaticity after irradiation−chromaticity before irradiation).

In addition, according to an embodiment of the present invention, the resin molded product may be an electromagnetic wave absorbing material, and as another example, the resin molded product may be a material for a RADAR module.

Meanwhile, the resin molded product may include a polyester-based resin composition which has a base resin including polybutylene terephthalate (PBT) and polycarbonate (PC), an inorganic filler, and a rubber-based impact modifier, and as another example, the resin molded product may be an injection-molded product of the polyester-based resin composition.

In addition, since the resin molded product includes the polyester-based resin composition, the resin molded product may satisfy the above permittivity, dielectric loss, high-speed impact strength, electromagnetic wave transmission coefficient, and color change, and thus may have excellent impact resistance, weather resistance, and dielectric properties.

Hereinafter, each component of the polyester-based resin composition will be described in detail.

Base Resin

The base resin includes polybutylene terephthalate (PBT) and polycarbonate (PC), and specifically, may be obtained by mixing the polybutylene terephthalate (PBT) and polycarbonate (PC).

In addition, the base resin may include 65 to 95 wt % of the polybutylene terephthalate (PBT) and 5 to 35 wt % of the polycarbonate (PC), and specifically, the base resin may include 70 to 90 wt % of the polybutylene terephthalate (PBT) and 10 to 30 wt % of the polycarbonate (PC).

Polybutylene Terephthalate (PBT)

The polybutylene terephthalate (PBT) has a repeating unit represented by Formula 1 below, and is a polyester-based resin having a melting temperature of 215° C. to 235° C.

[Formula 1]

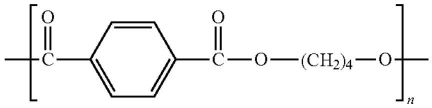

In Formula 1 above, n is an integer of 50 to 200.

When considering the balanced improvement of the processability and mechanical physical properties of a polyester-based resin including the polybutylene terephthalate (PBT), the polybutylene terephthalate may have an intrinsic viscosity (IV, η) of 0.6 dl/g to 1.8 dl/g measured according to ASTM D2857, and specifically, the polybutylene terephthalate may have an intrinsic viscosity of 0.7 dl/g to 1.3 dl/g or 0.9 dl/g to 1.3 dl/g.

Polycarbonate (PC)

The polycarbonate may be prepared by reacting an aromatic dihydroxy compound with a compound selected from phosgene or a carbonate precursor, and specifically, may be prepared by reacting an aromatic dihydroxy compound with phosgene or using an ester interchange reaction of an aromatic dihydroxy compound and a carbonate precursor such as diphenyl carbonate, diaryl carbonate, ethylene carbonate, and the like.

Examples of the aromatic dihydroxy compound include bis(4-hydroxyphenyl)methane, 1,1-bis(4-hydroxyphenyl) ethane, 2,2-bis(4-hydroxyphenol)propane(bisphenol A), 2,2-bis(4-hydroxyphenyl)butane, 1,1-bis(4-hydroxyphenyl) cyclopentane, 1,1-bis(4-hydroxyphenyl)cyclohexane, bis(4-hydroxylphenyl)ether, bis(4-sihydroxyphenyl)sulfide and even an aromatic dihydroxy compounds substituted with alkyl or halogen, etc., and specifically, 2,2-bis(4-hydroxyphenol)propane (bisphenol A) may be used.

In addition, the polycarbonate may be a homopolymer, or a copolymer of two or more types of aromatic hydroxy compounds.

In addition, the polycarbonate may have a weight average molecular weight of 30,000 to 80,000 g/mol, or 40,000 to 70,000 g/mol, in which case the chemical resistance and impact resistance of a resin molded product including the polycarbonate may be further excellent.

As another example, the polycarbonate may have a melt index of 2 to 20 g/10 min, or a melt index of 2 to 12 g/10 min at 300° C. and a load of 1.2 kg, or a melt index of 2 to 12 g/10 min.

Inorganic Filler

The inorganic filler is for preventing bending deformation of the resin molded product and supplementing impact resistance, and specifically, may be glass fiber.

In addition the glass fiber may have an average diameter of 1 to 50 μm, or 3 to 30 μm, and an average length of 100 μm to 3 mm, 300 μm to 1 mm, or 500 μm to 1 mm.

As another example, the glass fiber may be a chopped strand product, and the glass fiber may have a cross-section in the shape of a circle, a rectangle, an oval, a dumbbell, or a rhombus, and may have an average diameter of 7 to 20 μm or 7 to 15 μm, and an average length of 2 to 6 mm or 3 to 6 mm.

In addition, the inorganic filler may be included in an amount of 5 to 30 parts by weight, or 10 to 20 parts by weight based on 100 parts by weight of the base resin, and if the amount is less than the lower limit of the range, mechanical strength may be degraded, and if the amount is greater than the upper limit of the range, dielectric loss may be increased.

Rubber-Based Impact Modifier

In an embodiment of the present invention, the rubber-based impact modifier is for supplementing the weather resistance of a resin molded product including the rubber-based impact modifier, and may be one or more selected from linear low-density polyethylene (LLDPE) and an ethylene butyl acrylate copolymer.

In addition, the rubber-based impact modifier may be included in an amount of 5 to 15 parts by weight or 7 to 10 parts by weight based on 100 parts by weight of the base resin, and if the amount is less than the lower limit of the range, impact resistance may be significantly decreased, and if the amount is greater than the upper limit of the range, appearance characteristics of the molded product may be degraded.

As another example, the resin molded product includes 100 parts by weight of a base resin including polybutylene terephthalate (PBT) and polycarbonate (PC), 5 to 30 parts by weight of an inorganic filler, and 5 to 15 parts by weight of a rubber-based impact modifier, wherein the base resin may include 65 to 95 wt % of polybutylene terephthalate (PBT) and 5 to 35 wt % of polycarbonate (PC).

Meanwhile, according to an embodiment of the present invention, the polyester-based resin composition may further include a typical additive as long as it does not affect the required properties thereof, and the additive may be, for example, an antioxidant, a heat stabilizer, a light stabilizer, an ultraviolet absorbing additive, a matting agent, a plasticizer, a mold release agent, an anti-static agent, a flame retardant, an anti-drip agent, a radiation stabilizer, or a combination thereof. In addition, when the additive is included, the additive may be included in an amount of 5 parts by weight or less, or 0.001 to 5 parts by weight based on 100 parts by weight of the polyester-based resin composition.

RADAR Module

According to another aspect of the present invention, there is provided a RADAR module including the resin molded product.

In the above, the RADAR module may include one or more selected from a vehicle radome and a vehicle RADAR cover.

The RADAR module according to the present invention includes the aforementioned resin molded product, and thus, has excellent impact resistance, weather resistance, and dielectric properties.

EXAMPLES

Hereinafter, the present invention will be described in detail with reference to examples. However, the examples according to the present invention may be modified into other various forms, and the scope of the present invention should not be construed as being limited to the examples described below. The examples of the present invention are provided to more fully describe the present invention to those skilled in the art.

Hereinafter, compounds used in Examples and Comparative Examples are included in the corresponding materials described above, and are commercially available common materials, and exemplary specific features thereof are as follows.

(1) Polybutylene terephthalate (PBT): 1100-211M (CHANG CHUN Group)

(2) Polycarbonate (PC): PC1300-15(LG CHEM)

(3) Inorganic filler: Glass fiber (T-187H/MW12, NIPPON ELECTRONIC)

(4) Rubber-based impact modifier: Ethylene butyl acrylate copolymer (ELVALOY AC3427, DuPont)

Example 1

A base resin including 80 wt % of PBT and 20 wt % of PC, and 15 parts by weight of an inorganic filler and 7.5 parts by weight of a rubber-based impact modifier based on 100 parts by weight of the base resin were uniformly mixed using a super mixer to prepare a resin composition, and the resin composition was melt-kneaded at 250° C. using a twin-screw extruder to prepare pellets through extrusion processing. The pellets were dried at 100° C. for 5 hours and more, and then injection-molded using LS 170-ton injection machine at an injection temperature of 250° C. and a mold temperature of 100° C. to manufacture a resin molded product.

Example 2

A resin molded product was prepared in the same manner as in Example 1 except that in Example 1, 10 parts by weight of the rubber-based impact modifier was used.

Comparative Example 1

A LUMAX® EU5300 (LG CHEM) material was used as the material of Comparative Example 1.

Comparative Example 2

A base resin including 70 wt % of PBT and 30 wt % of SAN, and 20 parts by weight of an inorganic filler based on 100 parts by weight of the base resin were uniformly mixed using a super mixer to prepare a resin composition, and the resin composition was melt-kneaded at 250° C. using a twin-screw extruder to prepare pellets through extrusion processing. The pellets were dried at 100° C. for 5 hours and more, and then injection-molded using LS 170-ton injection machine at an injection temperature of 250° C. and a mold temperature of 100° C. to manufacture a resin molded product.

Experimental Example 1

The impact resistance, dielectric properties, weather resistance, and RADAR transmission performance of the resin molded products of Example 1 and Example 2 and the materials of Comparative Example 1 and Comparative Example 2 were comparatively analyzed, and the results are shown in Table 1 below.

(1) Impact Resistance

The impact resistance was confirmed by the falling surface impact strength, high-speed impact strength and impact absorbing energy according to ASTM D3763.

For the falling surface impact strength, five specimens each having a size of 100 mm×100 mm and a thickness of 2.25 T were prepared, and then five balls each having a particle diameter of 25 mm and a weight of 500 g were respectively dropped on the five specimens at a height of 30 cm from the specimens to visually confirmed whether there were surface cracks. It was evaluated as X when there were cracks on the surfaces of all of the specimens, evaluated as Δ when there were cracks on the surface of some of the specimens, and evaluated as ○ when there were no cracks on the surfaces of all of the specimens.

The high-speed impact strength and impact absorbing energy were measured by preparing a specimen having a size of 100 mm×100 mm and a thickness of 2 T according to ASTM D3763 standards and using Dynatup (CEAST9350, INSTRON Corporation) at room temperature (23±2° C.) and a relative humidity of 50% with an impact velocity set to 3.3 m/s and a time range for data acquisition set to 30 ms.

(2) Dielectric Properties

The dielectric properties were confirmed by permittivity and dielectric loss (tan loss), and the permittivity and the dielectric loss were measured by the OPEN RESONATOR analysis method using a Vector Network Analyzer (MS46322A, ANRITSU Corp.) after preparing a specimen having a size of 100 mm×100 mm and a thickness of 2 T, and was measured at a frequency of 77 GHz.

(3) Weather Resistance

Using an accelerated weathering tester (Weather-O-Meter (Ci5000), ATLAS Corp.), a specimen of 60 mm×150 mm (width×height) was prepared, and an ultraviolet ray (340 nm) of about 50 kJ/$m^2$ per day, a total of 1250 kJ/$m^2$ (about 25 days), was irradiated on a mirror surface of the specimen and on a corroded specimen under the conditions of Black PNL temperatures: 70±2° C. (light) and 38±2° C. (dark), Cycle conditions: irradiation for 40 minutes (50±5% RH), irradiation for 20 minutes (surface spray), irradiation for 60 minutes (50±5% RH), and non-irradiation for 60 minutes (95±5% RH/backside spray), irradiance: 0.75±0.02 W/$m^2$ (340 nm), and filter combinations: RIGHT LIGHT (inner filter) and QUARTZ (outer filter). Thereafter, the results were shown with chrominance (ΔE) which represents a change in chromaticity after irradiation compared to chromaticity before the irradiation (chromaticity after irradiation−chromaticity before irradiation) and a G/S grade. In the results, when the chrominance (ΔE) is 3.0 or less and the G/S grade is grade 4 or higher, it means that the weather resistance is excellent.

Here, the G/S grade represents a gray scale, wherein the gradual brightness from white to complete black is classified into 10 grades, which is classified stepwise by 10% with 0 for complete white and 10 for the complete black.

(4) RADAR Transmission Performance

The RADAR transmission performance was confirmed by an electromagnetic wave transmission coefficient in the frequency ranges of 77 GHz and 77 GHz to 79 GHz, and the electromagnetic wave transmission coefficient was measured utilizing a free space method using a dielectric condensing lens, and the measurement was performed with a measurement frequency set in the frequency ranges of 77 GHz and 77 GHz to 79 GHz, and a measurement position set around the center point of a specimen, and was represented by the largest absolute value of an electromagnetic wave transmission coefficient S21 in the frequency ranges.

TABLE 1

| Classifications | | Example 1 | Example 2 | Comparative Example 1 | Comparative Example 2 |
|---|---|---|---|---|---|
| Falling surface impact strength | Falling surface impact strength | ○ | ○ | x | ○ |
| | High-speed impact strength (kg · m/$s^2$) | 410 | 400 | 489 | 570 |
| | High-speed impact absorbing energy (kg · $m^2$/$s^2$) | 4.1 | 3.6 | 3.2 | 3.6 |

TABLE 1-continued

| Classifications | | Example 1 | Example 2 | Comparative Example 1 | Comparative Example 2 |
|---|---|---|---|---|---|
| Dielectric properties | Permittivity (F/m) | 3.07 | 3.09 | — | 3.06 |
| | Dielectric loss | 0.010 | 0.018 | — | 0.033 |
| Weather resistance | Chrominance (ΔE) | 1.55 (specular surface) 0.5 (corroded 12 μm) | 1.9 (specular surface) | — | 4.5 (specular surface) 2.9 (corroded 15 μm) |
| | G/S grade | 4.5 (specular surface) 4.5 (corroded 15 μm) | 4.5 (specular surface) | — | 3.0 (specular surface) 3.5 (corroded 15 μm) |
| Electromagnetic wave transmission coefficient | 77 GHz | −0.34 dB | −0.37 dB | — | −0.72 dB |
| | 77 GHz to 79 GHz | −0.37 dB | −0.43 dB | — | −0.64 dB |

As shown in Table 1 above, the resin molded products of Example 1 and Example 2 satisfy the specific values of dielectric loss, surface impact strength, and electromagnetic wave transmission coefficient as well as chrominance presented by the present invention, and have significantly excellent weather resistance, impact resistance, and dielectric properties compared to those of the resin molded products of Comparative Example 1 and Comparative Example 2.

Meanwhile, in the case of Comparative Example 1, all the specimens had cracks in the falling surface impact properties test, so that other properties thereof could not be confirmed.

What is claimed is:

1. A resin molded product having:

a permittivity of 3.7 F/m or less and a dielectric loss of 0.023 or less in a frequency range of 77 GHz;

a high-speed impact strength of 400 $kg \cdot m/s^2$ or greater according to ASTM D3763;

an electromagnetic wave transmission coefficient of −0.8 dB or greater in a frequency range of 77 GHz to 79 GHz; and a chrominance (ΔE) of 3.0 or less, wherein the chrominance represents a change in chromaticity after irradiation with an ultraviolet ray (340 nm) of 1,250 $kJ/m^2$ compared to chromaticity before the irradiation:

$$\Delta E = \text{chromaticity after irradiation} - \text{chromaticity before irradiation}.$$

2. The resin molded product of claim 1, wherein the resin molded product has a high-speed impact absorbing energy of 3.5 $kg \cdot m^2/s^2$ or greater according to ASTM D3763.

3. The resin molded product of claim 1, wherein the resin molded product has a permittivity of 2.5 F/m to 3.5 F/m and a dielectric loss of 0.005 to 0.020 in the frequency range of 77 GHz.

4. The resin molded product of claim 1, wherein the resin molded product has a high-speed impact strength of 400 $kg \cdot m/s^2$ or greater and a high-speed impact absorbing energy of 3.8 $kg \cdot m^2/s^2$ or greater according to ASTM D3763.

5. The resin molded product of claim 1, wherein the resin molded product has an electromagnetic wave transmission coefficient of −0.5 dB or greater in the frequency range of 77 GHz to 79 GHz.

6. The resin molded product of claim 1, comprising a polyester-based resin composition which includes:

a base resin including polybutylene terephthalate (PBT) and polycarbonate (PC);

an inorganic filler; and a rubber-based impact modifier.

7. The resin molded product of claim 6, wherein the base resin comprises 65 to 95 wt % of polybutylene terephthalate (PBT) and 5 to 35 wt % of polycarbonate (PC).

8. The resin molded product of claim 6, wherein the inorganic filler is included in an amount of 5 to 30 parts by weight based on 100 parts by weight of the base resin.

9. The resin molded product of claim 6, wherein the rubber-based impact modifier is included in an amount of 5 to 15 parts by weight based on 100 parts by weight of the base resin.

10. The resin molded product of claim 6, wherein the inorganic filler is glass fiber.

11. The resin molded product of claim 6, wherein the rubber-based impact modifier is one or more selected from a linear low-density polyethylene and an ethylene butyl acrylate copolymer.

12. The resin molded product of claim 6, comprising:

100 parts by weight of the base resin including polybutylene terephthalate (PBT) and polycarbonate (PC);

10 to 20 parts by weight of the inorganic filler; and 7 to 10 parts by weight of the rubber-based impact modifier, wherein the base resin includes 70 to 90 wt % of the polybutylene terephthalate (PBT) and 10 to 30 wt % of the polycarbonate (PC).

13. The resin molded product of claim 1, wherein the resin molded product is an electromagnetic wave absorbing material.

14. The resin molded product of claim 1, wherein the resin molded product is a material for a RADAR module.

15. A RADAR module comprising the resin molded product of claim 1.

16. The RADAR module of claim 15, wherein the RADAR module comprises one or more selected from a vehicle radome and a vehicle RADAR cover.

* * * * *